US012618963B2

(12) United States Patent
Zorgui et al.

(10) Patent No.: US 12,618,963 B2
(45) Date of Patent: May 5, 2026

(54) RADIO FREQUENCY SENSING COMMUNICATION

(71) Applicant: QUALCOMM Incorporated, San Diego, CA (US)

(72) Inventors: Marwen Zorgui, San Diego, CA (US); Srinivas Yerramalli, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 18/042,959

(22) PCT Filed: Oct. 13, 2021

(86) PCT No.: PCT/US2021/054659
§ 371 (c)(1),
(2) Date: Feb. 24, 2023

(87) PCT Pub. No.: WO2022/081624
PCT Pub. Date: Apr. 21, 2022

(65) Prior Publication Data
US 2023/0324541 A1    Oct. 12, 2023

(30) Foreign Application Priority Data
Oct. 16, 2020    (IN) .............................. 202021045182

(51) Int. Cl.
*G01S 13/87*    (2006.01)
*H04W 4/38*    (2018.01)

(52) U.S. Cl.
CPC ............... *G01S 13/87* (2013.01); *H04W 4/38* (2018.02)

(58) Field of Classification Search
CPC ... H04W 16/14; H04W 4/38; H04W 72/0453; H04W 84/18; G01S 13/87
See application file for complete search history.

(56) References Cited

U.S. PATENT DOCUMENTS

| | | | |
|---|---|---|---|
| 9,161,167 B2 * | 10/2015 | Aldana ................. | H04W 4/026 |
| 2002/0105439 A1 * | 8/2002 | Kiridena ............. | G08G 1/0962 340/901 |
| 2012/0310599 A1 | 12/2012 | Tanaka et al. | |
| 2014/0009275 A1 * | 1/2014 | Bowers ............... | G06Q 20/145 340/436 |

(Continued)

OTHER PUBLICATIONS

International Search Report and Written Opinion—PCT/US2021/054659—ISA/EPO—Feb. 8, 2022.

*Primary Examiner* — Dung Hong

(74) *Attorney, Agent, or Firm* — SUNSTEIN LLP

(57) ABSTRACT

An RF sensing method includes: producing, at an application device, an RF sensing request including a request for a network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing; sending the RF sensing request from the application device to the network entity; and receiving, at the application device from the network entity, an RF sensing report indicating a result of the RF sensing.

16 Claims, 12 Drawing Sheets

(56)    References Cited

U.S. PATENT DOCUMENTS

| | | | |
|---|---|---|---|
| 2017/0086202 A1 | 3/2017 | Chen | |
| 2017/0188241 A1* | 6/2017 | Mueck | H04W 16/14 |
| 2017/0355377 A1* | 12/2017 | Vijaya Kumar | B60W 50/0098 |
| 2018/0218607 A1* | 8/2018 | Baghel | G08G 1/162 |
| 2018/0220279 A1* | 8/2018 | Jung | H04L 12/2823 |
| 2020/0084278 A1* | 3/2020 | Cheng | H04W 4/44 |
| 2020/0119780 A1 | 4/2020 | Klemmer | |

* cited by examiner

1200

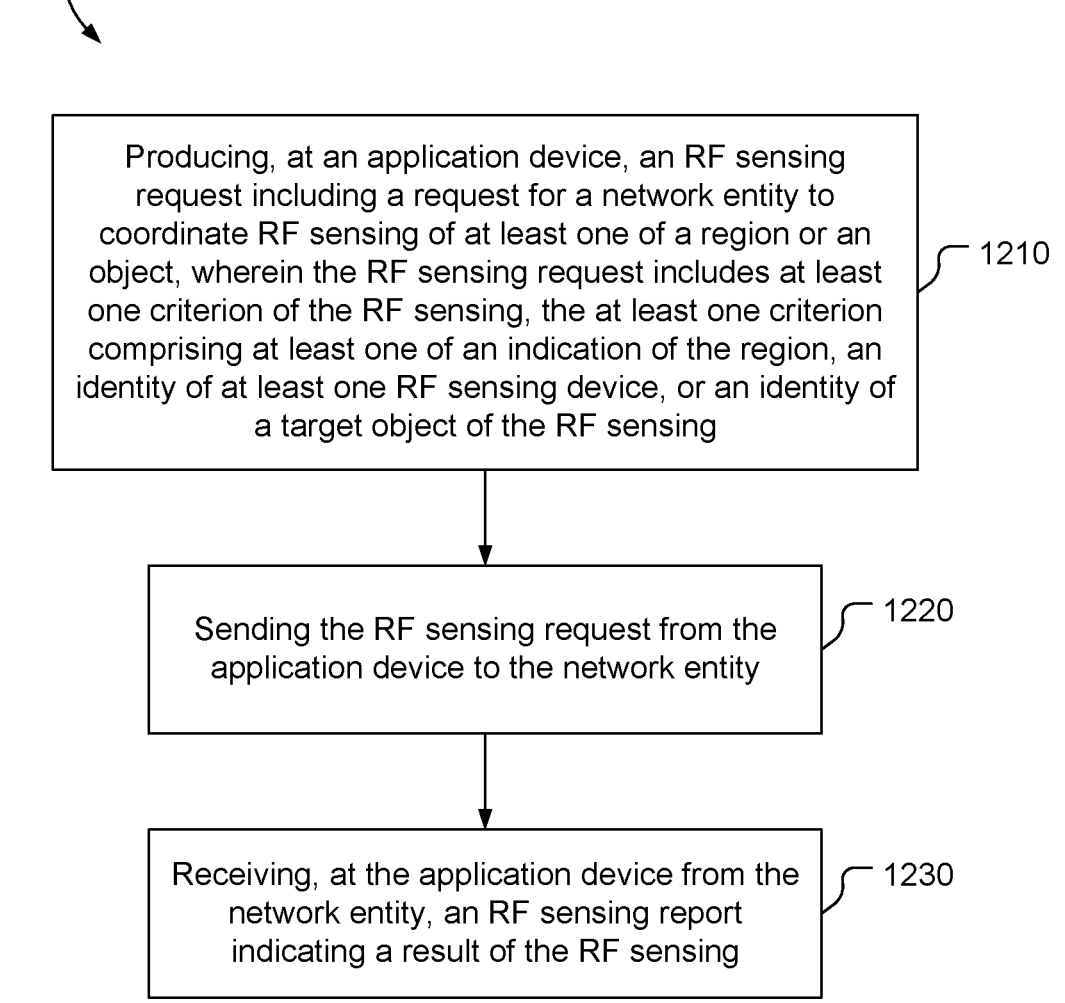

Producing, at an application device, an RF sensing request including a request for a network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing                    1210

Sending the RF sensing request from the application device to the network entity                    1220

Receiving, at the application device from the network entity, an RF sensing report indicating a result of the RF sensing                    1230

FIG. 12

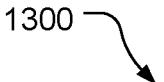

1300

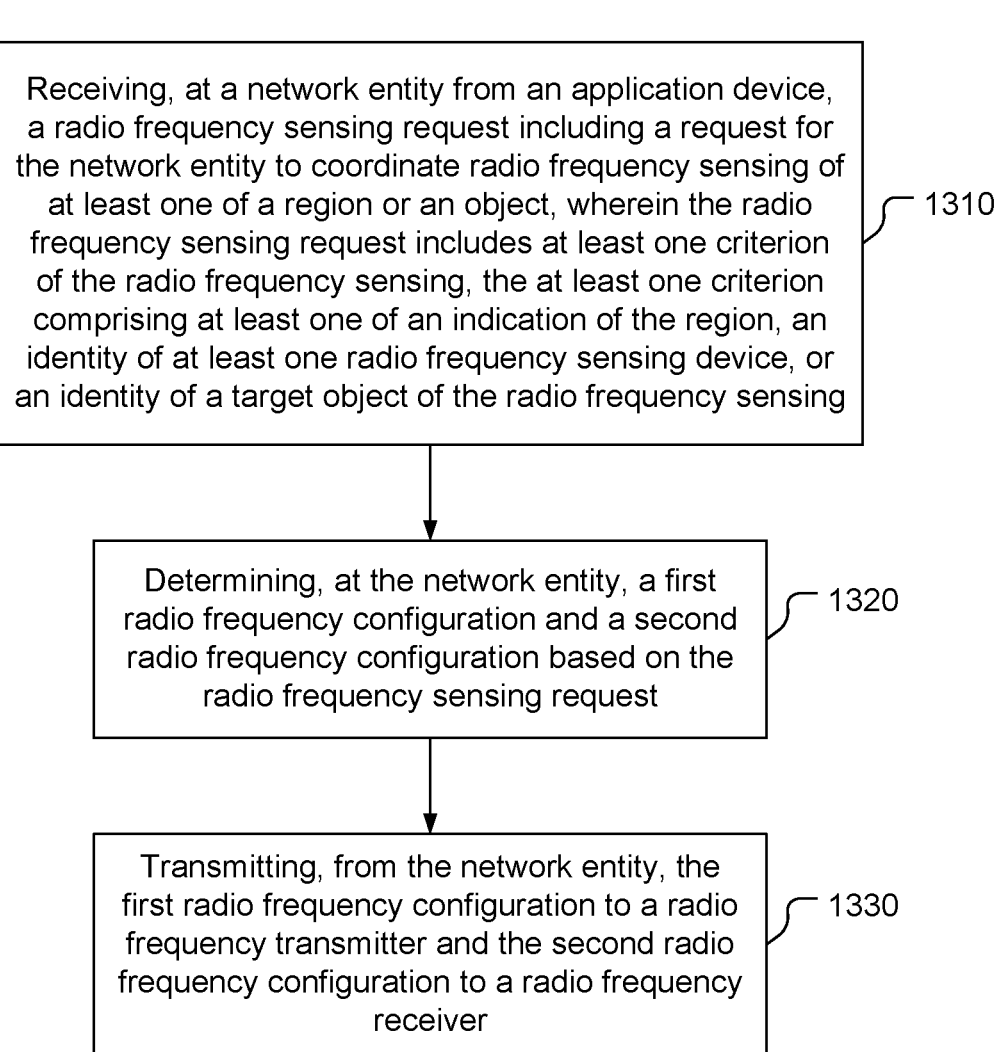

Receiving, at a network entity from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing

1310

Determining, at the network entity, a first radio frequency configuration and a second radio frequency configuration based on the radio frequency sensing request

1320

Transmitting, from the network entity, the first radio frequency configuration to a radio frequency transmitter and the second radio frequency configuration to a radio frequency receiver

RADIO FREQUENCY SENSING COMMUNICATION

CROSS-REFERENCE TO RELATED APPLICATIONS

This application claims the benefit of India Patent Application No. 202021045182, filed Oct. 16, 2020, entitled "RADIO FREQUENCY SENSING COMMUNICATION," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a radio frequency (RF) sensing request device includes: an interface; a memory; and one or more processors communicatively coupled to the interface and the memory and configured to: send an RF sensing request to a network entity via the interface, the RF sensing request including a request for the network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing; and receive, via the interface from the network entity, an RF sensing report indicating a result of the RF sensing.

In an embodiment, an RF sensing method includes: producing, at an application device, an RF sensing request including a request for a network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing; sending the RF sensing request from the application device to the network entity; and receiving, at the application device from the network entity, an RF sensing report indicating a result of the RF sensing.

In an embodiment, an RF sensing request device includes: means for producing an RF sensing request including a request for a network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing; means for sending the RF sensing request to the network entity; and means for receiving, from the network entity, an RF sensing report indicating a result of the RF sensing.

In an embodiment, a non-transitory, processor-readable storage medium includes processor-readable instructions to cause one or more processors of an RF sensing request device, in order to facilitate positioning of a user equipment, to: produce an RF sensing request including a request for a network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing; send the RF sensing request to the network entity; and receive, from the network entity, an RF sensing report indicating a result of the RF sensing.

In an embodiment, a network entity includes: an interface; a memory; and one or more processors communicatively coupled to the interface and the memory and configured to: receive, via the interface from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing; determine a first radio frequency configuration and a second radio frequency configuration based on the radio frequency sensing request; and transmit, via the interface, the first radio frequency configuration to a radio frequency transmitter and the second radio frequency configuration to a radio frequency receiver.

In an embodiment, a radio frequency sensing coordination method includes: receiving, at a network entity from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing; determining, at the network entity, a first radio frequency configuration and a second radio frequency configuration based on the radio frequency sensing request; and transmitting, from the network entity, the first radio frequency configuration to a radio frequency transmitter and the second radio frequency configuration to a radio frequency receiver.

In an embodiment, a network entity includes: means for receiving, from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing; means for determining a first radio frequency configuration and a second radio frequency configuration based on the radio frequency sensing request; and means for transmitting the first radio frequency configuration to a radio frequency transmitter and the second radio frequency configuration to a radio frequency receiver.

In an embodiment, a non-transitory, processor-readable storage medium includes processor-readable instructions to cause one or more processors of a network entity to: receive, from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing; determine a first radio frequency configuration and a second radio frequency configuration based on the radio frequency sensing request; and transmit the first radio frequency configuration to a radio frequency transmitter and the second radio frequency configuration to a radio frequency receiver.

BRIEF DESCRIPTION OF THE DRAWINGS

FIG. 12 is a block flow diagram of a radio frequency sensing method.

FIG. 13 is a block flow diagram of a radio frequency sensing coordination method.

DETAILED DESCRIPTION

Figure 1:
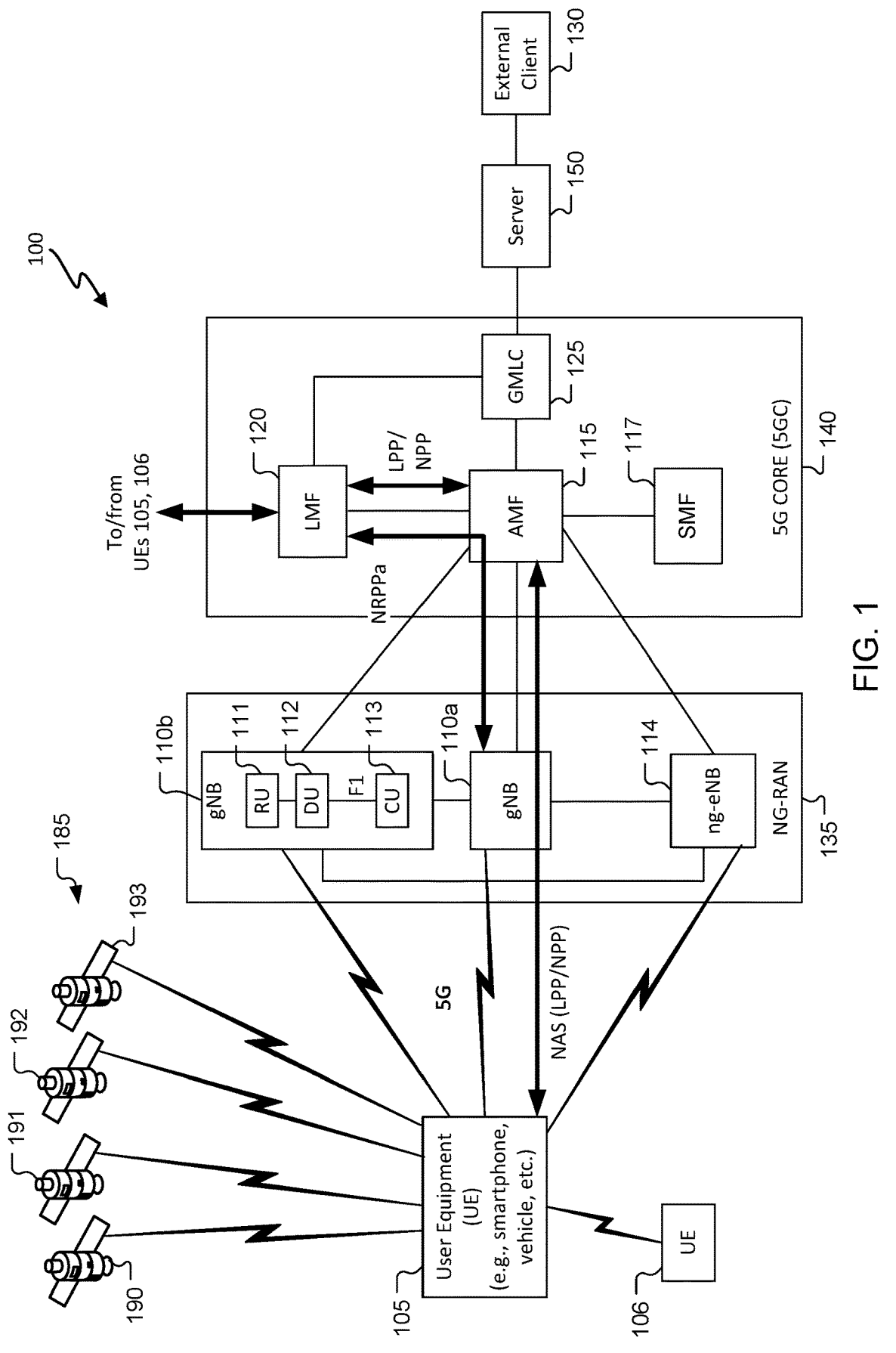
FIG. 1 is a simplified diagram of an example wireless communications system.

Techniques are discussed herein for radio frequency (RF) sensing using a cellular network. For example, an application device (also called an application function) may request RF sensing (also called passive localization) to be performed, e.g., for object location detection, for object movement detection, for environment mapping, for biological function detection, etc. The application device may send a request to a network entity, e.g., a sensing management function that coordinates the physical signaling (from one or more transmitters and reception by one or more receivers) for the RF sensing. The request may include assistance data to help with coordinating the RF sensing and/or processing results of the RF sensing. The network entity may obtain RF sensing results (e.g., measurements) from the receiver(s) and may process the RF sensing results into further results (e.g., object type, object presence, biological function metric, etc.) and provide an RF sensing report to another entity, e.g., to the application device. The application device may provide feedback to the network entity to assist with future RF sensing and/or future processing of RF sensing results. These are examples, and other examples (of UEs and/or criteria) may be implemented.

Numerous applications may benefit from techniques discussed herein. For example, object identification may be performed based on an amount of energy reflected by the object that depends on one or more reflecting surfaces of the object, which is a function of the object (e.g., an automated guided vehicle (AGV), furniture, humans, other living things, etc.). For human identification, a classifier may be trained based on reflection from different persons, and an entity may be able to recognize particular humans based on small variations in reflections caused by each person. For example, different persons have different shapes that generate different amounts of reflected energy. Identification of particular humans may be particularly feasible in an environment with a limited number of humans to distinguish, e.g., in a home, a small business, etc. As another example application, crowd sizes may be detected. An entity may be trained to determine and output a size of a crowd in a particular area based on sensed information. Different levels of crowd detection may be performed, e.g., a binary detection (presence of a crowd or absence of a crowd), or multi-level detection (e.g., small crowd, moderate crowd, large crowd, etc.). Multi-level detection may be based on thresholds of persons present. Crowd detection may be separate from, or build upon, human presence detection. As another example application, one or more objects may be traced. For example, a detected object may be tracked over time, and a duration of the tracking may be unlimited or specified (e.g., by an application function). As another example application, object speed may be detected. For example, speed of a tracked object may be determined and may be indicated precisely and/or classified by range of speed (e.g., slow, medium, fast, etc.). As another example application, various biological functions may be detected and metrics of biological functions may be determined. For example, breathing rates and/or heartbeat rates may be detected based on radio reflections. Using determined rates, an entity may determine one or more corresponding conditions such as emotions, sleep stages, etc. of a person whose biological function metric(s) is(are) determined. For example, different emotions may cause a person's heartbeat rate to change and/or magnitude of chest displacement to change. Such variations may result in different RF reflections that may be detected and categorized corresponding to emotions. By signal processing RF reflections, an entity may determine (e.g., recognize) such variations and map the variations to biological conditions (e.g., emotion, sleep stage, etc.).

Items and/or techniques described herein may provide one or more of the following capabilities, as well as other capabilities not mentioned. RF sensing may be provided using a cellular network, e.g., cellular-connected devices. Any of numerous RF sensing applications may be facilitated, e.g., automotive radar applications, object presence detection, environmental mapping, biological function presence detection, biological function metric determination, etc. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a nontransitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110*a*. While the gNB 110*a* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beam-forming, and includes a portion of the physical (PHY) layer. The RU 111 may perform the DFE using massive multiple input/multiple output (MIMO) and may be integrated with one or more antennas of the gNB 110*a*. The DU 112 hosts the Radio Link Control (RLC), Medium Access Control (MAC), and physical layers of the gNB 110*a*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*a*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/ system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
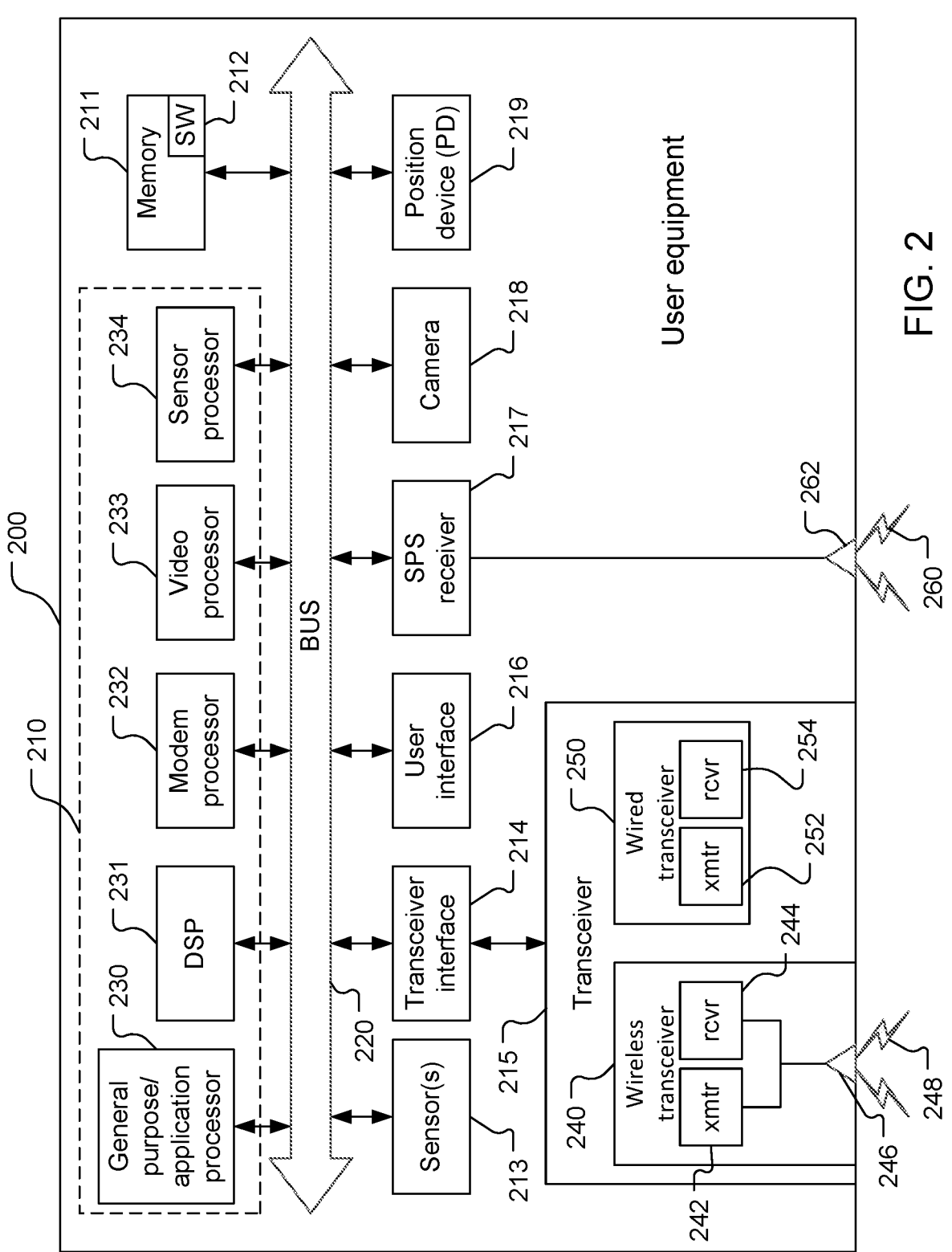
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PCS), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
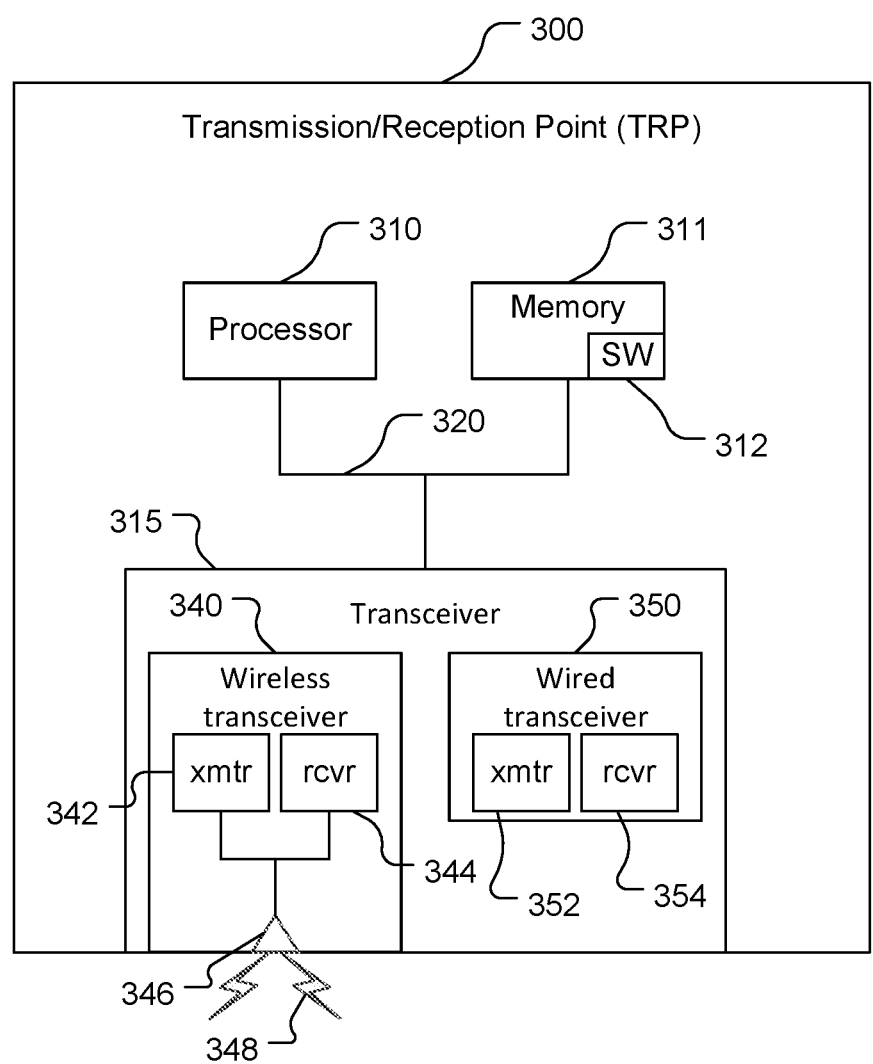
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
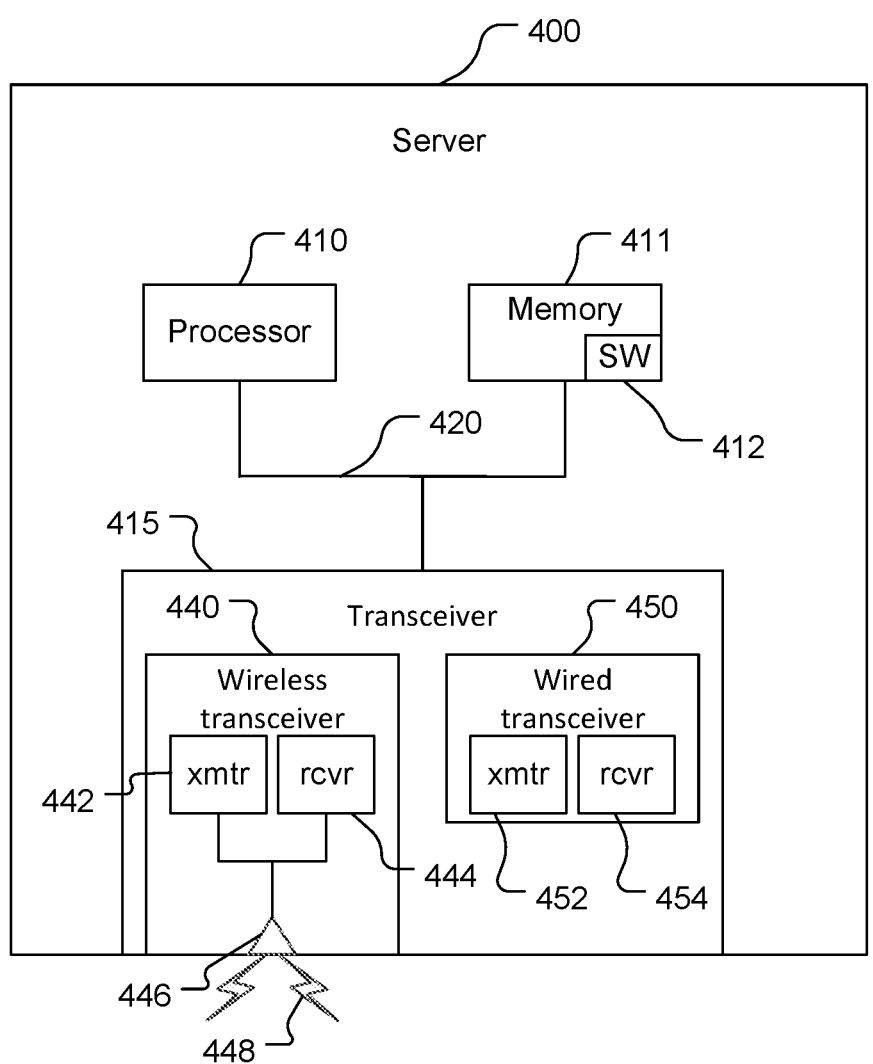
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PCS), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LWF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal.

The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational conges-tion may result at the TRPs that are trying to measure many UEs concurrently.

RTT positioning may be UE-based or UE-assisted. In UE-based RTT, the UE 200 determines the RTT and corre-sponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncer-tainty (e.g., by including an area or volume within which the location is expected to be included with some specified or default level of confidence).

RF Sensing (Passive Localization)

Figure 5:
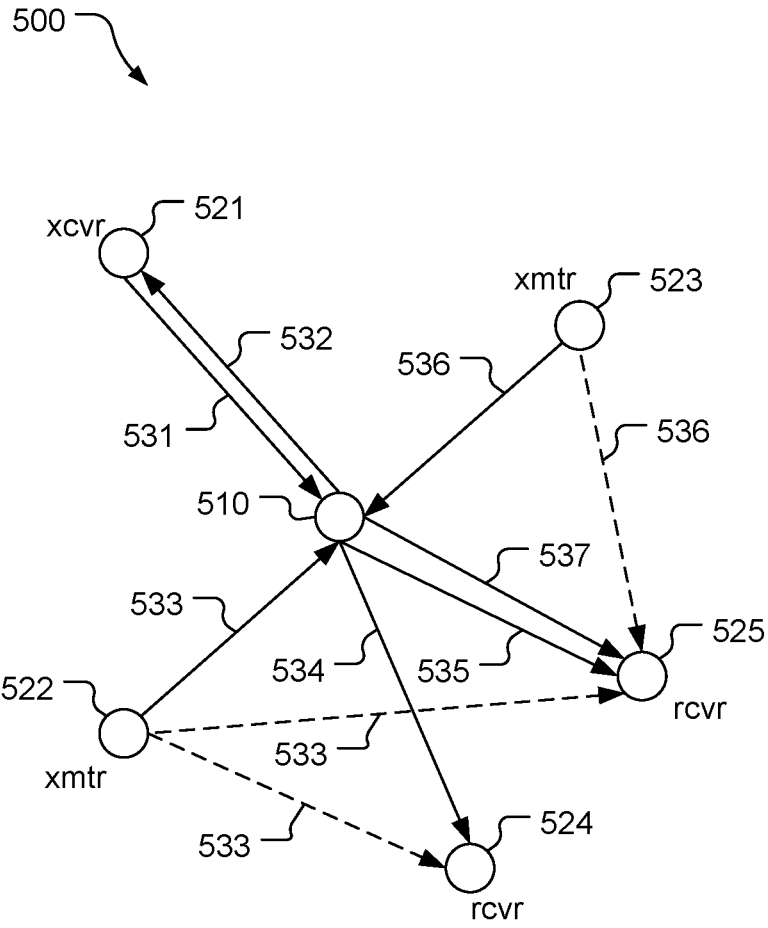
FIG. 5 simplified diagram of a passive localization configuration.

Referring to FIG. 5, a passive localization configuration 500 includes a target object 510, a transceiver 521, trans-mitters 522, 523, and receivers 524, 525. Whereas position-ing techniques such as RTT, OTDOA, UTDOA (UL OTDOA), and E-CID are active localization techniques, with a target device including an RF device, passive local-ization techniques may be used to determine position infor-mation for a target device that may or may not contain an RF device. Passive localization is known as RF sensing and has numerous applications including health detection, contex-tual information acquisition, automotive radar, etc. Health detection applications detect one or more biological func-tions (e.g., measuring one or more biological metrics) and include, for example, heartbeat detection, heart rate detec-tion, respiration detection, and respiration rate detection. The biological function(s) may be monitored, being detected over time. Contextual information acquisition applications include, for example, location detection, location tracking, direction finding, and range estimation. Automotive radar applications include, for example, smart cruise control (to maintain a separation (e.g., driver-specified distance, a safe distance (e.g., driver-specified or preprogrammed time sepa-ration)) between a first vehicle and second vehicle ahead of the first vehicle and in the same lane), collision avoidance, etc.

The configuration 500 is an example of multistatic radar. A co-located transmitter and receiver (transceiver) is called a monostatic radar and a transmitter not co-located with the receiver is called a bistatic radar. A multistatic radar contains multiple spatially diverse monostatic and/or bistatic radars with a shared coverage area. In this example, the transceiver 521 provides a monostatic radar, with a transmitted signal 531 being reflected as a reflected signal 532 that is received by the transceiver 521. The transmitter of the transceiver 521, the transmitters 522, 523, and the receivers 524, 525 provide bistatic radars, with a transmitted signal 533 from the transmitter 522 being reflected as reflected signals 534, 535 that are received by the receivers 524, 525, respectively, and a transmitted signal 536 from the transmitter 523 being reflected as a reflected signal 537 that is received by the receiver 525. Other signals may be transmitted, and other reflections received (e.g., by the receiver of the transceiver 521), but are not shown in FIG. 5 for the sake of simplicity of the figure. For example, the transmitted signal 536 may be reflected and received by the receiver 524, and/or the signal 531 may be reflected and received by one or both of the receivers 524, 525, but these reflections are not shown for sake of simplicity of the figure. In addition to receiving the reflected signals 534, 535, 537, one or more of the receivers 524, 525 may receive the transmitted signals 533, 536 directly from the transmitters 522, 523, with the transmitted signals 533, 536 and the reflected signals 534, 535, 537 being used to determine RF sensing information (e.g., range to an object, object presence, channel characteristics, etc.). The transmitted signal 531 may also be received by one or more of the receivers 524, 525 directly and reflections of the transmitted signal 531 received by one or more of the receivers 524, 525, but these signal paths are not shown in FIG. 5 for the sake of simplicity of the figure.

Figure 6:
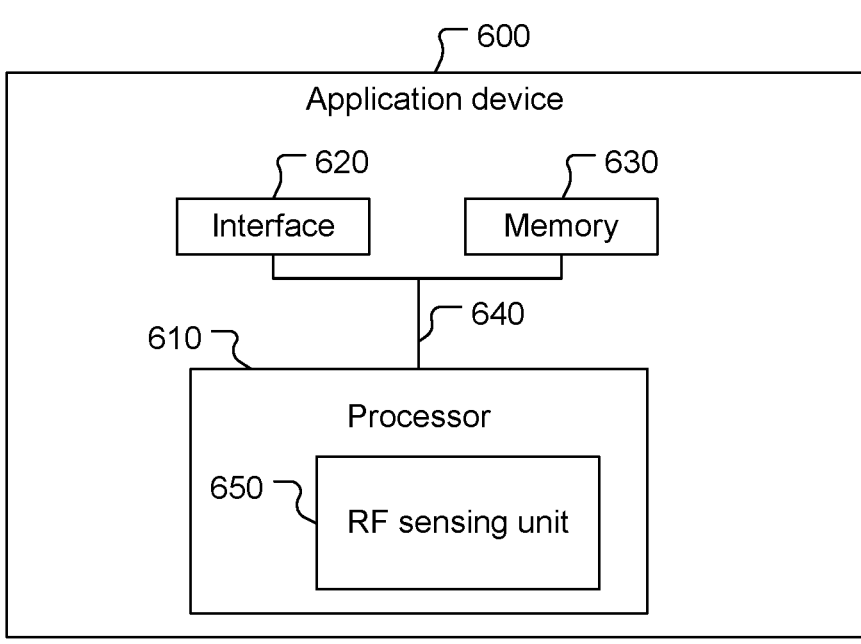
FIG. 6 is a block diagram of an example application device.

Referring to FIG. 6, with further reference to FIGS. 1-5, an application device 600 includes a processor 610, an interface 620, and a memory 630 communicatively coupled to each other by a bus 640. The application device 600 may include the components shown in FIG. 6, and may include one or more other components. For example, the application device 600 may be a UE, may be part of the UE 200, part of the TRP 300, or part of the server 400, and thus may include one or more components shown in FIG. 2, FIG. 3, or FIG. 4. For example, the processor 610 may include one or more of the components of the processor 210. The interface 620 may include one or more of the components of the transceiver 215, or the transceiver 315, or the transceiver 415. For example, the interface 620 may include the wireless transmitter 242 and the antenna 246, or the wireless receiver 244 and the antenna 246, or the wireless transmitter 242, the wireless receiver 244, and the antenna 246. Also or alternatively, the interface 620 may include the wired transmitter 252 and/or the wired receiver 254. The memory 630 may be configured similarly to the memory 211, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the application device 600 performing a function as shorthand for one or more appropriate components (e.g., the processor 610 and the memory 630) of the application device 600 performing the function. The processor 610 (possibly in conjunction with the memory 630 and, as appropriate, the interface 620) includes an RF sensing unit 650 configured to request RF sensing for determining position information (e.g., one or more RF measurements, one or more ranges, one or more position estimates, etc.) for a target object, and for receiving RF sensing reports regarding an RF sensing outcome. The RF sensing unit 650 is discussed further below, and the description may refer to the processor 610 generally, or the application device 600 generally, as performing any of the functions of the RF sensing unit 650, and the application device 600 is configured to perform the functions of the RF sensing unit 650. The application device 600 is an application layer entity that may be connected to an SnMF (Sensing Management Function) directly or indirectly (e.g., through the AMF 115) to request the RF sensing and to receive the RF sensing report.

Figure 7:
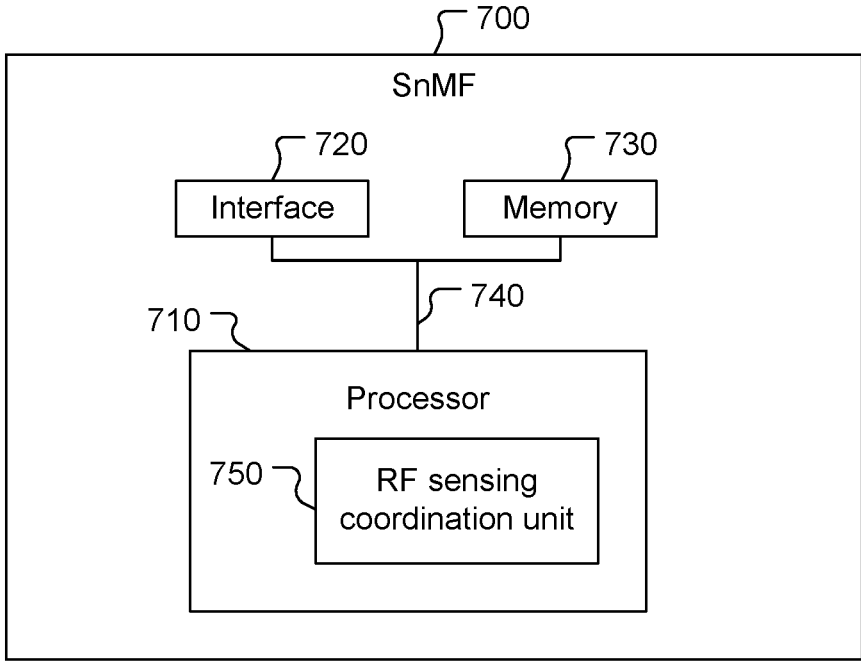
FIG. 7 is a block diagram of an example sensing management function.

Referring also to FIG. 7, an SnMF 700 includes a processor 710, an interface 720, and a memory 730 communicatively coupled to each other by a bus 740. The SnMF 700 may include the components shown in FIG. 7, and may include one or more other components. For example, the SnMF 700 may be part of the server 400, and thus may include one or more components shown in FIG. 4 and/or in FIG. 3, or may be a standalone device. For example, the interface 720 may include one or more of the components of the transceiver 415 (e.g., the wireless transmitter 442 and the antenna 446 and/or the wireless receiver 444 and the antenna 446 and/or the wired transmitter 452 and/or the wired receiver 454) and/or the transceiver 315 (e.g., the wireless transmitter 342 and the antenna 346 and/or the wireless receiver 344 and the antenna 346 and/or the wired transmitter 352 and/or the wired receiver 354). The memory 730 may be configured similarly to the memory 411 and/or the memory 311, e.g., including software with processor-read-able instructions configured to cause the processor 710 to perform functions. The SnMF 700 and the server 400 and/or the TRP 300 may be integrated in a physical entity, with the SnMF 700 and the server 400 and/or the TRP 300 sharing one or more components.

The description herein may refer to the processor 710 performing a function, but this includes other implementations such as where the processor 710 executes software (stored in the memory 730) and/or firmware. The description herein may refer to the SnMF 700 performing a function as shorthand for one or more appropriate components (e.g., the processor 710 and the memory 730) of the SnMF 700 performing the function. The processor 710 (possibly in conjunction with the memory 730 and, as appropriate, the interface 720) includes an RF sensing coordination unit 750. The RF sensing coordination unit 750 is configured to respond to an RF sensing request from the application device 600 by scheduling RF sensing, collecting information from the RF sensing, and providing RF sensing reports with outcomes of the RF sensing (e.g., including position information for one or more target objects and/or one or more target environments). The RF sensing coordination unit 750 is discussed further herein, and the description may refer to the processor 710 generally, or the SnMF 700 generally, as performing any of the functions of the RF sensing coordination unit 750, and the SnMF 700 is configured to perform the functions of the RF sensing coordination unit 750.

RF sensing may be requested by the RF sensing unit 650 and coordinated by the RF sensing coordination unit 750 for a variety of purposes. For example, the RF sensing unit 650 may request object presence detection to detect the presence of one or more target objects in a specified region. For object presence detection (or simply, presence detection), the RF sensing coordination unit 750 may select one or more relevant nodes for the region, e.g., one or more base stations (e.g., gNBs) and/or one or more UEs in or near the region, e.g., a room, an outdoor area, etc., and determine whether a channel is time varying (indicating introduction, removal, and/or movement of one or more objects). As another example, the RF sensing unit 650 may request health (e.g., biological function) detection for one or more entities (e.g., heart rate detection for a human being or other living thing). For biological function detection, the RF sensing coordination unit 750 may coordinate a pair of entities (e.g., one or more base stations and/or one or more UEs) to obtain Doppler measurements of signals reflected from a target object. The Doppler measurements may be analyzed to determine biological function, e.g., heart rate, respiration, respiration rate, etc. As another example, the RF sensing unit 650 may request environment mapping to measure one or more characteristics of an environment. For environment mapping, the RF sensing coordination unit 750 may coordinate measurement (e.g., schedule signaling and request measurement) of one or more characteristics (e.g., path loss, fading, interference, Doppler shift, etc.) of one or more RF channels by one or more entities (e.g., one or more base stations and/or one or more UEs). The SnMF 700 may be configured to provide SLAM (Simultaneous Localization And Mapping) to determine an environment map and determine a position of a target object within the map.

Figure 8:
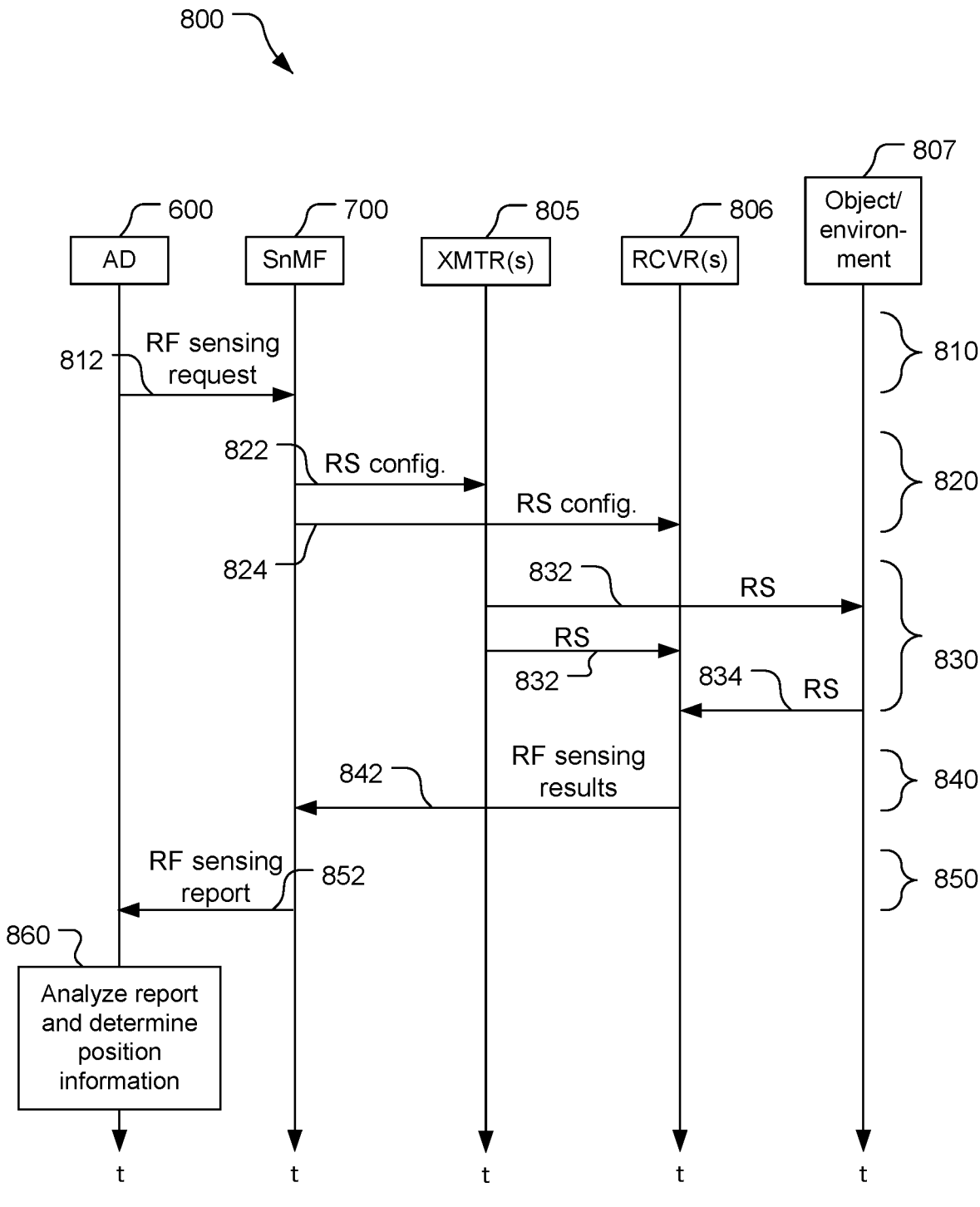
FIG. 8 is a signaling and process flow for radio frequency sensing.

Referring also to FIG. 8, the application device (AD) 600 and the SnMF 700, in conjunction with one or more transmitters 805 and one or more receivers 806, are configured to cooperate to provide RF sensing for determining position information of a target object/environment 807. FIG. 8 shows a signaling and process flow 800 for RF sensing. The flow 800 includes the stages shown and is an example, as stages may be added, rearranged, and/or removed.

At stage 810, the AD 600 sends an RF sensing request 812 to the SnMF 700. The RF sensing unit 650 is configured to produce the RF sensing request 812, and to produce the RF sensing request 812 to indicate a type of RF sensing requested, e.g., presence detection, biological function detection, environment mapping, environment detection, etc. The RF sensing request 812 may indicate the target object(s)/environment 807 to be detected and/or the type of RF sensing to be performed. The RF sensing request 812 may include assistance data that may assist the SnMF 700 (and/or other entity) with RF sensing, position information determination, object tracking, object identification, etc. For example, the assistance data may provide information as to a location of the target object/environment 807, and/or may provide an indication of an identified target object type (e.g., person, etc.) especially if the RF sensing request 812 is provided in response to an RF sensing report 852 (i.e., based on information provided in the RF sensing report 852), discussed further below. Also or alternatively, the assistance data may include the identity(ies) of one or more of the transmitter(s) 805 and/or one or more of the receiver(s) 806 to use for RF sensing. The AD 600 (e.g., the RF sensing unit 650) may be configured to produce the RF sensing request 812 to include one or more parameters/criteria regarding the requested RF sensing. For example, the RF sensing request 812 may include an indication of a time limit for the RF sensing, e.g., a length of time for the RF sensing to be performed, a future time for the RF sensing to terminate, etc. As another example, the RF sensing request 812 may include a frequency of the RF sensing (how often RS sensing signaling is sent/measured) and/or a frequency of reporting RF sensing results (how often RF sensing results, e.g., measurements, are reported). As another example, the RF sensing request 812 may include one or more criteria for reporting presence of the target object(s)/environment 807, e.g., to report any object new to the region, to report any object that leaves the region, to report all objects in the region with non-zero Doppler measurements, or to report any object within the region with at least a threshold Doppler measurement value. These criteria are examples, and one or more other criteria may be used instead of, or in addition to, one or more of the example criteria listed.

Figure 9:
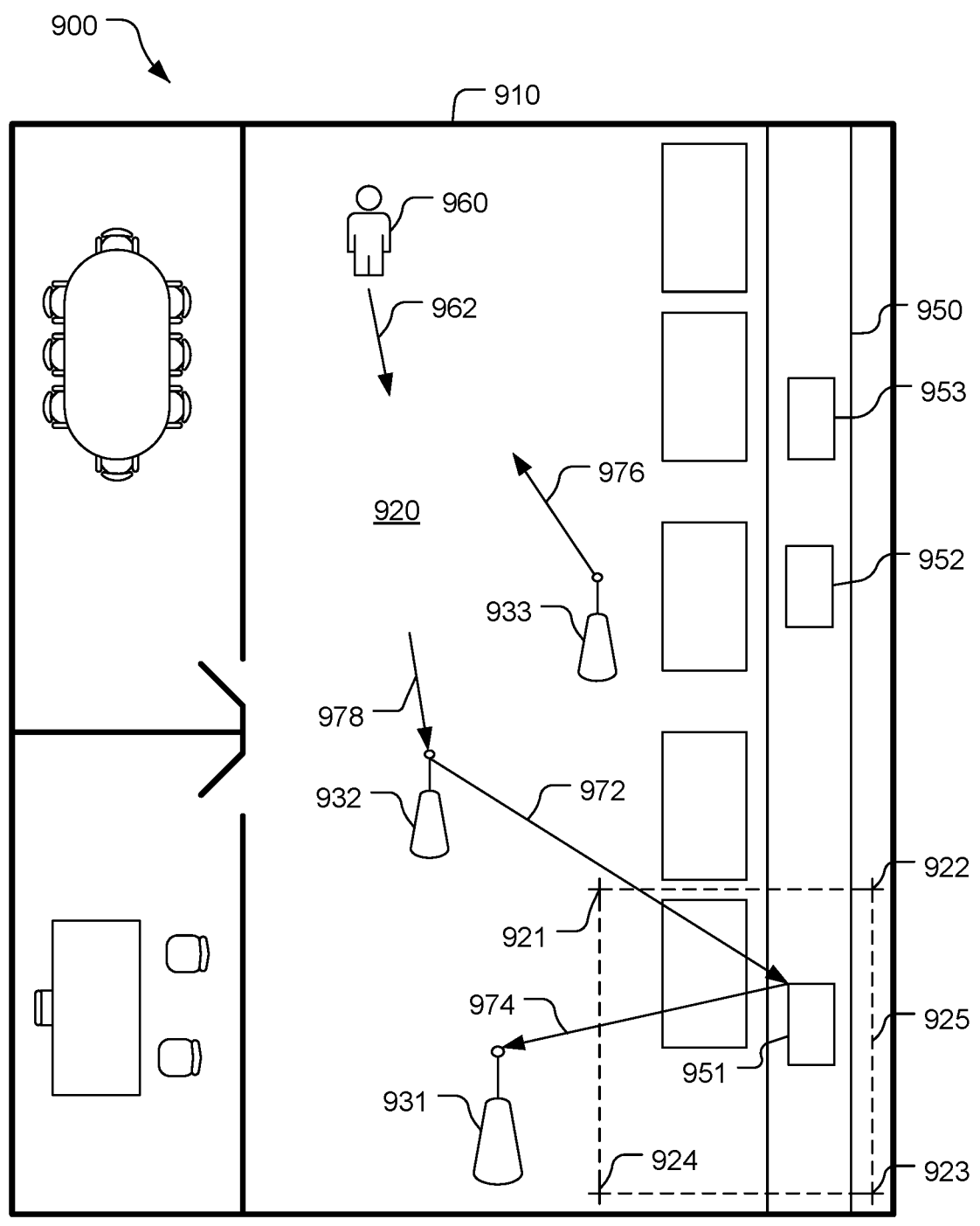
FIG. 9 is a simplified diagram of an example of presence detection by radio frequency sensing.

Referring also to FIG. 9, for a presence detection request, the RF sensing unit 650 may produce the RF sensing request 812 to identify a region of a floor 900 of a building 910 as the target object/environment 807 to be monitored to determine presence (e.g., introduction, removal, and/or movement) of the target object/environment 807 and/or to identify the target object(s)/environment 807 to be detected. The AD 600 may be configured to identify the region in one or more of a variety of ways, e.g., one or more parameters defining a perimeter of the region (e.g., coordinates of vertexes of the region, coordinates of a center of the region and a shape of the region, coordinates of points on a perimeter, etc.), the identity(ies) of one or more base stations (e.g., one or more gNBs and/or one or more access points, etc.) to be used for RF sensing, etc. The region definition may, for example, be an indication of the floor 900, or may be an indication of a room 920 within the floor 900, or may comprise coordinates for each of four corners 921, 922, 923, 924 of a region 925 to be monitored, or may comprise an indication of base stations, e.g., an access point 931 to be used by the transmitter 805 and access points 932, 933 to be used the receivers 806. These region definitions are examples, and regions may be defined in other ways as well. The RF sensing request 812 may identify any of a variety of objects, e.g., a person, a group of persons, an inanimate object (e.g., an automatic guided vehicle (AGV), also called an auto-mated guided vehicle), etc. as the target object(s)/environment 807 to be detected (e.g., tracked). For example, the RS sensing request 812 may provide an indication of a person 940, or an indication of a group of items 951, 952, 953 under assembly along a conveyor belt 950.

Figure 10:
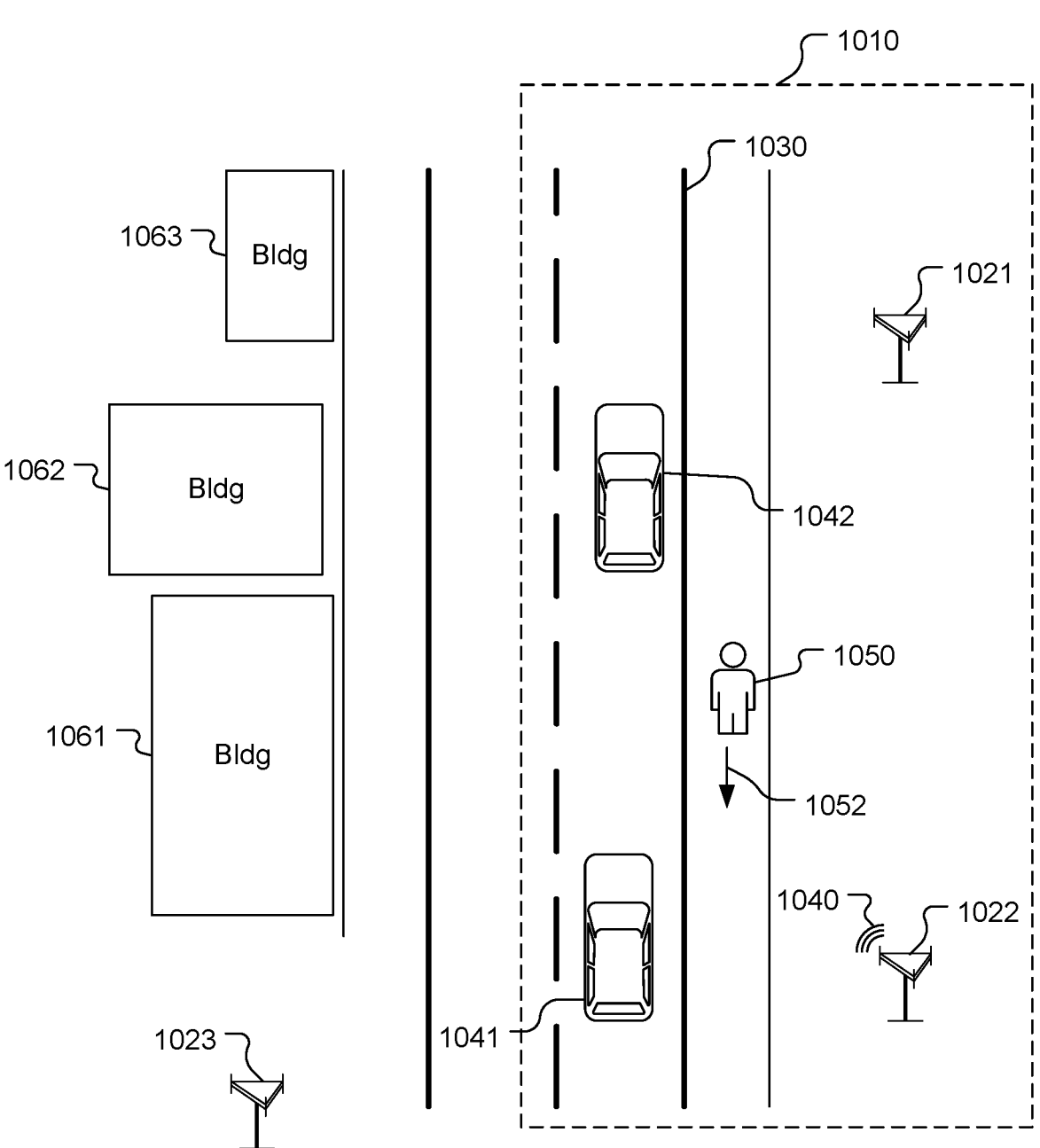
FIG. 10 is a simplified diagram of an example of environment mapping by radio frequency sensing.

Referring also to FIG. 10, for an environmental detection (e.g., mapping) request, the RF sensing unit 650 may be configured to produce the RF sensing request 812 to identify a region as the target object/environment 807 to be detected. The RF sensing request 812 may identify the region for which the environment is to be detected similarly to the identification of a region to be monitored for presence detection (e.g., specifying a perimeter of a region 1010, specifying the transmitter(s) 805 and the receiver(s) 806, e.g., from base stations 1021, 1022, 1023 (with the region being the area over which signals transmitted by the transmitter(s) 805 can be reflected and received by the receiver(s) 806), specifying a geographic item such as a street 1030, etc.). The RF sensing request 812 may indicate the channel (s) to be monitored and may indicate the channel characteristic(s) to be detected. For example, the RS sensing request 812 may indicate one or more inter-base-station channels (e.g., one or more inter-gNB channels) and/or one or more UE-to-base-station channels. The channel characteristic(s) may include, for example, path loss, fading, interference, and/or Doppler shift, etc. The RF sensing request may include one or more criteria for the characteristic(s), e.g., respective minimum thresholds before reporting a corresponding characteristic (e.g., path loss). While presence detection is shown in FIG. 9 as being in an indoor scenario and environmental detection is shown in FIG. 10 as being in an outdoor scenario, these are examples and not limiting of the disclosure as presence detection may be performed for outdoor scenarios and environmental detection may be performed for indoor scenarios, or combinations thereof.

Figure 11:
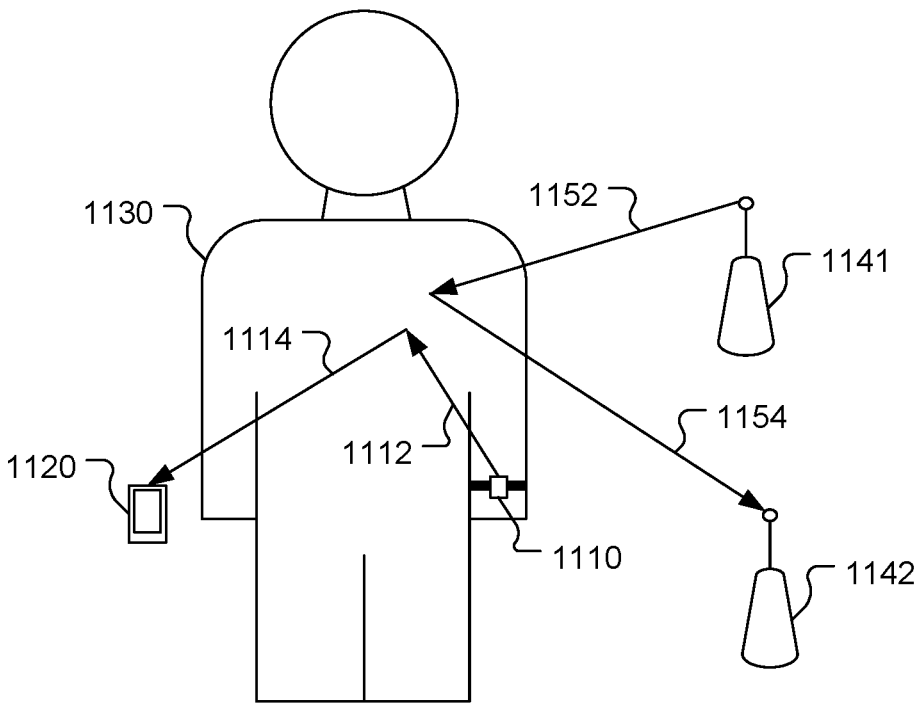
FIG. 11 is a simplified diagram of an example of biological function detection by radio frequency sensing.

Referring also to FIG. 11, for a biological function detection request, the RF sensing unit 650 may produce the RF sensing request 812 to identify the transmitter(s) 805 and the receiver(s) 806 to use, and/or may identify the entity whose function(s) is(are) to be detected. For example, the RF sensing unit 650 may include identities of a smartwatch 1110 as the transmitter 805 (or one of the transmitters 805) and a smartphone 1120 as the receiver 806 (or one of the receivers 806) for biological function detection of a person 1130 (as the target object/environment 807). Also or alternatively, the RF sensing request 812 may include an identity of the person 1130. Also or alternatively, the RF sensing request 812 may, for example, identify base stations 1141, 1142 as the transmitter 805 and the receiver 806, respectively. The use of the smartwatch 1110 in conjunction with the smartphone 1120, i.e., two UEs, is an example, and not limiting of the disclosure.

Similarly, the use of the two base stations 1141, 1142 is an example, and not limiting of the disclosure. For example, for biological function detection, the RF sensing request 812 may indicate one or more UEs and one or more base stations. The RF sensing request 812 may include one or more parameters and/or one or more criteria for the biological function detection. For example, the RF sensing request 812 may include an indication that a Doppler rate is to be detected (e.g., by the receiver 806 and/or the SnMF 700). The RF sensing request 812 may, for example, include a range (e.g., upper and lower bounds) of an expected Doppler shift. The expected Doppler shift may be assistance data that the entity detecting the Doppler shift may use to narrow a search for Doppler shifts. Also or alternatively, the range may be used as a reporting criterion such that the heart rate is reported if the Doppler shift is within the indicated range and not reported otherwise.

Referring again to FIG. 8, with continued reference to FIGS. 1-7 and 9-11, at stage 820, the SnMF 700 determines the transmitter(s) 805 and the receiver(s) 806 to use for the RF sensing, and schedules corresponding reference signal signaling. The RF sensing coordination unit 750 may use information in the RF sensing request 812 to determine the transmitter(s) 805 and the receiver(s) 806. For example, the RF sensing coordination unit 750 may use the type of RF sensing to be performed (e.g., presence detection, environ- ment detection, biological function detection, etc.), an indi- cated region, an indicated biological function type, and/or indicated transmitter(s) and/or receiver(s) to determine the physical signaling, the transmitter(s) 805, and the receiver(s) 806 desired or needed to provide the requested RF sensing. The RF sensing coordination unit 750 may select the physi- cal signaling in order to achieve desired sensing, e.g., to cover a region whose environment is to be detected, to cover a presence detection region, to enable detection of a bio- logical function of an indicated object (e.g., person), and/or to include the indicated transmitter(s) and/or the indicated receiver(s), if any, etc. For example, UL sounding by a UE for RF sensing for environment mapping may be preferable. The RF sensing coordination unit 750 may send RS con- figuration messages 822, 824 to the transmitter(s) 805 and the receiver(s) 806, respectively. The RS configuration mes- sages 822, 824 contain at least the parameters of the RS to be sent by the transmitter(s) 805. The RS configuration messages 822, 824 may be sent as requests for RS signaling to respective serving TRPs 300 of the transmitter(s) 805 and the receiver(s) 806, with the TRPs 300 sending configuration parameters to the transmitter(s) 805 and the receiver(s) 806. The RS configuration messages 822, 824 are thus shown functionally, with each of the messages 822, 824 possibly comprising multiple messages and conveyed from the SnMF 700 to the transmitter(s) 805 and the receiver(s) 806 via one or more intermediate entities.

At stage 830, the transmitter(s) 805 send the configured RS. The transmitter(s) 805 is(are) configured to respond to the RS configuration message(s) 822 by sending appropriate RS 832. The RS 832 is(are) received by the receiver(s) 806 directly and is(are) reflected by the target object/environ- ment and reflected RS 834 is(are) received by the receiver(s) 806. For example, the access point 932 may transmit an RS 972 that is reflected off the item 951 and a reflected RS 974 is received by the access point 931, e.g., for determining presence of the item 951 in the region 925, determining velocity of the item 951, etc. As another example, the access point 933 may send an RS 976 that is reflected off a person 960 as a reflected RS 978 and received by the access point 932 for use in determining RF sensing information about the person 960 (e.g., presence, velocity 962, position, etc.). As another example, an RS 1040 may be emitted by the base station 1022, reflected by vehicles 1041, 1042, a person 1050, and buildings 1061, 1062, 1063, and reflected RS received by the base station 1021 and/or the base station 1023. The reflected signals may be used to determine RS sensing information such as position and/or velocity of the vehicles 1041, 1042 and/or the person 1050 (e.g., a velocity 1052 of the person 1050), environmental characteristics, e.g., channel parameters, etc. As another example, the smart- watch 1110 may emit an RS 1112 that is reflected off the person 1130 and a reflected RS 1114 received by the smartphone 1120 and used for RF sensing (e.g., hear beat detection, heart rate determination, etc.). As another example, the base station 1141 may emit an RS 1152 that is reflected off the person 1130 as a reflected RS 1154 that is received by the base station 1142 such that the reflected RS 1154 may be used for RF sensing (e.g., for respiration detection, respiration rate determination, etc.). The target objects or features of the environment, because they reflect signals and thus appear to send the reflected signals, may be called virtual transmitters or virtual access points. The receiver(s) 806 measure the RS 834 from one or more virtual transmitters.

At stage 840, the receiver(s) 806 report RF sensing results in an RF sensing results message 842 to the SnMF 700 (directly and/or via a serving TRP). For example, the receiv- er(s) 806 may measure ToA and/or AoA of the RS 834 and the RF sensing results message 842 may include one or more measurements and/or information derived from one or more measurements (e.g., one or more ranges, one or more position estimates, etc.). The RF sensing results message 842 may include one or more channel characteristics (e.g., path loss, fading, interference, Doppler, etc.). For example, for a UE receiver, the receiver 806 may record and report all paths, path strengths, path losses, fading, etc. The RF sensing results message 842 may include different charac- teristics for different objects (e.g., different Doppler) and/or environments, e.g., different channels (e.g., different fre- quencies).

At stage 850, the SnMF 700 may determine and send an RF sensing report 852 to the AD 600 for the target object/ environment 807. The SnMF 700 may collect the RF sensing results from one or more RF sensing results messages 842 and perform one or more operations to determine the RF sensing report 852. The RF sensing report 852 may include one or more indications of, e.g., presence of a target object in a region of interest, a metric of a biological function (e.g., heart rate, respiration rate), motion of an object, a number of objects detected, object type(s) (e.g., person, group of per- sons, other living thing, AGV, UAV (Unoccupied Aerial Vehicle), etc.), channel characteristic(s), position and/or angle to an object, confidence level of one or more corre- sponding indications, location of a virtual transmitter, loca- tion(s) of corresponding entity(ies), etc. For example, the SnMF 700 may indicate the presence of the item 951 in the region 925 and/or the velocity of the item 951 and/or that a single object is presently in the region 925. As another example, the RF sensing report 852 may indicate the veloc- ity 962 (speed and direction) of the person 960 (as the target object/environment 807) in the room 920 and identify the target object/environment 807 as a person. A velocity indi- cated may be a linear velocity such as the velocity 962, a radial velocity, or an angular velocity. The SnMF 700 may determine position information and include the position information in the RF sensing report 852. For example, the RF sensing report 852 may include the position(s) of one or more target objects, one or more ranges to one or more target objects, directions to one or more target objects relative to one or more reference points (e.g., base station locations), and/or location(s) of one or more virtual access points (virtual transmitters corresponding to reflectors). As another example, the RF sensing report 852 may include one or more location indications of one or more of the transmitter(s) 805 and/or the receiver(s) 806. For example, the transmitter location(s) and/or receiver location(s) may be reported if desired information (e.g., heart rate, location, etc.) was not obtained due to the location(s) of the transmitter(s) 805 and/or the receiver(s) 806 (e.g., if a transmitter 805 and a receiver 806 were too far apart to obtain heart rate information, at least with a desired accuracy). The RF sensing report 852 may include other information such as an indication of whether the RF sensing was successful or not (i.e., a positive or negative outcome of the requested RF sensing), e.g., whether a location of an object was detected within a requested threshold accuracy, or whether a heart rate was able to be determined, etc. The SnMF 700 (e.g., the RF sensing coordination unit 750) may use information from the RF sensing request 812 to affect the RF sensing report 852. For example, the SnMF 700 may send the RF sensing report 852 with a reporting frequency indicated by the RF sensing request 812, and/or for a reporting duration indicated by the RF sensing request 812.

At stage 860, the AD 600, e.g., the RF sensing unit 650, may analyze the RF sensing report 852 and may determine position information from the RF sensing report 852. The RF sensing unit 650 may process information from the RF sensing report 852 to determine position information such as one or more locations of objects, one or more ranges, one or more object velocities, channel characteristics, etc. The RF sensing unit 650 may be configured to determine other information such as object presence, biological function presence and/or metric value, object separation (e.g., for automotive radar applications such as smart cruise control and/or collision avoidance, and/or other applications such as navigation), etc. Also or alternatively, the RF sensing unit 650 may analyze the RF sensing report 852 for one or more reasons other than to determine position information. For example, the RF sensing unit 650 may compare an RS sensing result in the RF sensing report 852 with information obtained by the RF sensing unit 650 by other means. The RF sensing unit 650 may, for example, compare an indication of a location of an object and/or a type of an object with other information, e.g., one or more images obtained by a camera (e.g., the camera 218), information input by a user (e.g., through the user interface 216), etc. The RF sensing unit 650 may determine that the RF sensing result in the RF sensing report 852 is incorrect (e.g., based on the RF sensing result being inconsistent with other information) and take appropriate action, e.g., discarding or ignoring the RF sensing result. For example, the RF sensing unit 650 may discard or ignore an object ID of "person" based on analysis of an image of the object indicating that the object is not a person (e.g., is an AGV). As another example, the RF sensing unit 650 may discard or ignore a location of an object based on user input indicating that the object is disposed at a different location that the location indicated in the RF sensing report 852. These are examples and not limiting of the disclosure.

The flow 800 may return to stage 810. The AD 600, e.g., the RF sensing unit 650, may send a follow-up sensing request to the SnMF 700, i.e., the RF sensing request 812 may be an original sensing request or a follow-up sensing request. The follow-up sensing request may be based on the RF sensing report 852. For example, the RF sensing request 812 may request different information than previously requested, e.g., the location of another object, tracking of another object, environmental sensing, tracking of fewer than all objects previously requested to be tracked, etc. As another example, the RF sensing request 812 may include one or more indications confirming the accuracy of information in the RF sensing report 852 and/or one or more indications of the inaccuracy of information in the RF sensing report 852 (e.g., contradicting indications in the RF sensing report 852 of object location, object type, etc.). The SnMF 700, e.g., the RF sensing coordination unit 750, may use the information that is based on the RF sensing report 852 and/or other assistance data to adjust signaling requested (e.g., by the RS configuration messages 822, 824) and/or one or more algorithms for determining the RF sensing report 852 (e.g., identifying object types, determining positions, etc.). The RF sensing coordination unit 750 may employ machine learning (e.g., a neural network) to adjust the signaling and/or the algorithm(s). The assistance data may include assistance data discussed above and/or other data such as data based on information from one or more other sources, e.g., one or more of the sensor(s) 213. The flow 800 may be repeated multiple times such that information from the RF sensing report 852, and/or information derived therefrom, may be provided as feedback in the RF sensing request 812 which may result in iterative improvement of the information in the RF sensing report 852 and thus improve confidence in the results.

Referring to FIG. 12, with further reference to FIGS. 1-11, an RF sensing method 1200 includes the stages shown. The method 1200 is, however, an example and not limiting. The method 1200 may be altered, e.g., by having stages added, removed, rearranged, combined, performed concurrently, and/or having single stages split into multiple stages.

At stage 1210, the method 1200 includes producing, at an application device, an RF sensing request including a request for a network entity to coordinate RF sensing of at least one of a region or an object, where the RF sensing request includes at least one criterion of the RF sensing, the at least one criterion comprising at least one of an indication of the region, an identity of at least one RF sensing device, or an identity of a target object of the RF sensing. For example, the RF sensing unit 650 of the application device 600 may use user input, a request from an application for which RF sensing information is desired (or even needed), input from one or more sensors, information from an RF sensing report (e.g., the RF sensing report 852), and/or other information to produce a request for RF sensing (e.g., the RF sensing request 812). The request includes a request for a network entity, e.g., the SnMF 700, to coordinate RF sensing of a region and/or an object, and specifies one or more criteria for the RF sensing. The request for the region and/or the object may be direct, e.g., defining the region or identifying the object, or may be indirect or implicit, e.g., identifying one or more of the transmitters 805 and one or more of the receivers 806. The region may be indicated for a variety of types of RF sensing such as object presence detection or environment detection. The RF sensing request 812 may, for example, include assistance data that may assist the SnMF 700 (and/or other entity) with RF sensing, position information determination, object tracking, object identification, etc. The processor 610, possibly in combination with the memory 630, may comprise means for producing the RF sensing request.

At stage 1220, the method 1200 includes sending the RF sensing request from the application device to the network entity. For example, the AD 600 sends the RF sensing request 812 to the SnMF 700. The processor 610, possibly in combination with the memory 630, and the interface 620 (e.g., the wireless receiver 244 and the antenna 246, or the wired transmitter 252, or other device) may comprise means for sending the RF sensing request to the network entity.

At stage 1230, the method 1200 includes receiving, at the application device from the network entity, an RF sensing report indicating a result of the RF sensing. For example, the AD 600 receives the RF sensing report 852 from the SnMF 700, e.g., the RF sensing coordination unit 750. The processor 610, possibly in combination with the memory 630, in combination with the interface 620 (e.g., the wireless receiver 244 and the antenna 246, or the wired receiver 254, or another device) may comprise means for receiving the RF sensing report.

Implementations of the method 1200 may include one or more of the following features. In an example implementation, the at least one criterion comprises an indication of a type of the RF sensing. In a further example implementation, the type of the RF sensing comprises one of object presence detection, environment detection, or biological function detection. In another example implementation, the RF sensing request includes the request for the network entity to coordinate RF sensing of the region, and the at least one criterion comprises a plurality of coordinates defining the region. In another example implementation, the RF sensing request includes the request for the network entity to coordinate RF sensing of the region, and the request is for object presence detection in the region. For example, the RF sensing request 812 may request object presence detection for a specified region, such as the region 925. In a further example implementation, the at least one criterion comprises a threshold Doppler phase shift for the object presence to be reported.

Also or alternatively, implementations of the method 1200 may include one or more of the following features. In an example implementation, the RF sensing request includes a request for the network entity to coordinate RF sensing of at least one biological function. In a further example implementation, the at least one biological function includes at least one of heart beat or respiration, and the at least one criterion comprises a first identity of an RF transmitter and a second identity of an RF receiver to be used for the RF sensing. For example, the RF sensing request 812 may request detection of the existence of a heartbeat, existence of respiration of a subject, heart rate, and/or respiration rate. In another further example implementation, the at least one criterion comprises a Doppler rate. In a further example implementation, the at least one criterion comprises a range of Doppler rates. The RF sensing request may indicate a Doppler phase shift value (e.g., a minimum value) and/or a Doppler phase shift range for RF sensing, e.g., for heartbeat reporting, respiration reporting, and/or object presence reporting.

Also or alternatively, implementations of the method 1200 may include one or more of the following features. In an example implementation, the at least one criterion comprises at least one of a duration of the RF sensing, a first frequency of the RF sensing, or a second frequency at which the network entity is to provide the RF sensing report indicating the result of the RF sensing. The RF sensing request 812 may, for example, indicate for how long to perform the requested RF sensing, how often to send and measure reference signals, and/or how often to report RF sensing results. In another example implementation, the at least one criterion comprises an indication of an expected result of the RF sensing. For example, the RF sensing request 812 may indicate an expected object type, expected object location, and/or one or more expected channel characteristics, etc. The expected result may be based on user input, sensor input (e.g., one or more images captured by a camera), etc. The expected result may be used to ignore erroneous information to improve reported RF sensing results accuracy. In another example implementation, the method 1200 includes: receiving, at the application device, input regarding a subject of the RF sensing from at least one information source other than the network entity; and sending a response to the RF sensing report from the application device to the network entity, the response including the input regarding the subject of the RF sensing. For example, the RF sensing unit 650 may receive input (e.g., user input and/or sensor input) regarding an RF sensing result and send feedback to the SnMF 700 based on the input, e.g., to confirm or contradict or revise the RF sensing result (e.g., to overrule or correct an object type indicated in the RF sensing report 852, to overrule or correct an object location specified in the RF sensing report 852). The SnMF 700 may use the input to update one or more algorithms and/or to update reference signal signaling (e.g., one or more selected transmitters and/or one or more selected receivers) for future RF sensing to improve the accuracy of reported RF sensing results. In another example implementation, the RF sensing request is a first RF sensing request, and the method 1200 further includes sending, from the application device to the network entity, a second RF sensing request based on the first RF sensing request. For example, the processor 610 may receive the RF sensing report 852 at stage 850, analyze the RF sensing report 852 at stage 860, determine a new request, e.g., as discussed above, based on the RF sensing report 852, and return to stage 810 to send the new request to the SnMF 700. This may help iteratively improve the request, and thus the resultant RF sensing and responsive action(s) (e.g., evasive movement, route change, etc.).

Also or alternatively, implementations of the method 1200 may include one or more of the following features. In an example implementation, method 1200 may include: receiving the RF sensing request at the network entity; scheduling transmission of at least one reference signal from at least one RF transmitter; receiving RF sensing results from at least one receiver of at least one reflected reference signal; producing the RF sensing report; and sending the RF sensing report from the network entity to an RF sensing request device. For example, the RF sensing coordination unit 750 may receive the RF sensing request, schedule RS transmission for the RF sensing (e.g., sending the RS configuration messages 822, 824), receive sensing results (e.g., the RF sensing results from the receiver(s) 806), produce the RF sensing report 852 including one or more RF sensing results (possibly including position information), and send the RF sensing report, e.g., to the entity requesting the RF sensing, e.g., the AD 600. The processor 710, possibly in combination with the memory 730, in combination with the interface 720 (e.g., a wireless receiver, a wireless transmitter, a wired receiver, and/or a wired transmitter) may comprise means for receiving the RF sensing request, scheduling RS transmission, receiving RF sensing results, producing the RF sensing report, and sensing the RF sensing report. In another example implementation, the result of the RF sensing comprises a result indication of at least one of an object position, an object type, channel characteristics, or an object presence. For example, the RF sensing report 852 may indicate one or more positions of one or more objects, one or more object types of one or more respective objects, one or more channel characteristics, and/or the presence (or lack of presence) of one or more objects in one or more respective regions.

Referring to FIG. 13, with further reference to FIGS. 1-11, a radio frequency sensing coordination method 1300 includes the stages shown. The method 1300 is, however, an example and not limiting. The method 1300 may be altered, e.g., by having stages added, removed, rearranged, combined, performed concurrently, and/or having single stages split into multiple stages.

At stage 1310, the method 1300 includes receiving, at a network entity from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing. For example, the SnMF 700 receives the RF sensing request 812 from the application device 600 at stage 810 of the flow 800. The processor 710, possibly in combination with the memory 730, in combination with the interface 720 (e.g., the wireless receiver 444 and the antenna 446 and/or the wired receiver 454, and/or the wireless receiver 344 and the antenna 346 and/or the wired receiver 354) may comprise means for receiving the radio frequency sensing request.

At stage 1320, the method 1300 includes determining, at the network entity, a first radio frequency configuration and a second radio frequency configuration based on the radio frequency sensing request. For example, the SnMF 700 determines RS configurations at stage 820 as discussed above. The processor 710, possibly in combination with the memory 730, in combination with the interface 720 may comprise means for determining the first radio frequency configuration and the second radio frequency configuration.

At stage 1330, the method 1300 includes transmitting, from the network entity, the first radio frequency configuration to a radio frequency transmitter and the second radio frequency configuration to a radio frequency receiver. For example, the SnMF 700 transmits the RS configuration messages 822, 824 to the transmitter 805 and the receiver 806, respectively. The SnMF 700 may determine RS configurations for one or more transmitters and one or more receivers and send the RS configurations to the transmitter(s) and the receiver(s) as appropriate. The processor 710, possibly in combination with the memory 730, in combination with the interface 720 (e.g., the wireless transmitter 442 and the antenna 446 and/or the wired transmitter 452, and/or the wireless transmitter 342 and the antenna 346 and/or the wired transmitter 352) may comprise means for transmitting the first reference signal configuration message and the second reference signal configuration.

Implementations of the method 1300 may include one or more of the following features. In an example implementation, determining the first radio frequency configuration and the second radio frequency configuration is based further on desired radio frequency sensing to be achieved by the radio frequency transmitter and the radio frequency receiver. In a further example implementation, the desired radio frequency sensing comprises detection of an environment of the region, presence detection in the region, biological function detection of the object, or any combination thereof.

Also or alternatively, implementations of the method 1300 may include one or more of the following features. In an example implementation, the method 1300 further includes: receiving, at the network entity from the radio frequency receiver, a radio frequency result message indicating one or more results of radio frequency sensing by the radio frequency receiver; determining, at the network entity, a radio frequency sensing report based on the radio frequency result message; and transmitting, from the network entity to the application device, the radio frequency sensing report.

For example, the SnMF receives the RS sensing results message 842 from the receiver 806, uses information in the RS sensing results message 842 to determine the RF sensing report 852, and transmits the RF sensing report 852 to the application device 600. The processor 710, possibly in combination with the memory 730, in combination with the interface 720 (e.g., the wireless receiver 444 and the antenna 446 and/or the wired receiver 454, and/or the wireless receiver 344 and the antenna 346 and/or the wired receiver 354) may comprise means for receiving the radio frequency sensing result message. The processor 710, possibly in combination with the memory 730, in combination with the interface 720 may comprise means for determining the radio frequency sensing report. The processor 710, possibly in combination with the memory 730, in combination with the interface 720 (e.g., the wireless transmitter 442 and the antenna 446 and/or the wired transmitter 452, and/or the wireless transmitter 342 and the antenna 346 and/or the wired transmitter 352) may comprise means for transmitting the radio frequency sensing report. In a further example implementation, the radio frequency sensing report indicates presence of the target object in a region of interest, a metric of a biological function, motion of the target object, a number of objects detected, a position of the target object, or any combination thereof.

IMPLEMENTATION EXAMPLES

Implementation examples are provided in the following numbered clauses.

Clause 1. A radio frequency (RF) sensing request device comprising:
an interface;
a memory; and
one or more processors communicatively coupled to the interface and the memory and configured to:
send an RF sensing request to a network entity via the interface, the RF sensing request including a request for the network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing; and
receive, via the interface from the network entity, an RF sensing report indicating a result of the RF sensing.

Clause 2. The RF sensing request device of clause 1, wherein the at least one criterion comprises an indication of a type of the RF sensing.

Clause 3. The RF sensing request device of clause 2, wherein the type of the RF sensing comprises one of object presence detection, environment detection, or biological function detection.

Clause 4. The RF sensing request device of clause 1, wherein the RF sensing request includes the request for the network entity to coordinate the RF sensing of the region, and wherein the at least one criterion comprises a plurality of coordinates defining the region.

Clause 5. The RF sensing request device of clause 1, wherein the RF sensing request includes the request for the network entity to coordinate the RF sensing of the region, the request being for object presence detection in the region.

Clause 6. The RF sensing request device of clause 5, wherein the at least one criterion comprises a threshold Doppler phase shift for the object presence to be reported.

Clause 7. The RF sensing request device of clause 1, wherein the RF sensing request includes a request for the network entity to coordinate the RF sensing of at least one biological function.

Clause 8. The RF sensing request device of clause 7, wherein the at least one biological function includes at least one of heartbeat or respiration, and wherein the at least one criterion comprises a first identity of an RF transmitter and a second identity of an RF receiver to be used for the RF sensing.

Clause 9. The RF sensing request device of clause 7, wherein the at least one criterion comprises a Doppler rate.

Clause 10. The RF sensing request device of clause 9, wherein the at least one criterion comprises a range of Doppler rates.

Clause 11. The RF sensing request device of clause 1, wherein the at least one criterion comprises at least one of a duration of the RF sensing, a first frequency of the RF sensing, or a second frequency at which the network entity is to provide the RF sensing report indicating the result of the RF sensing.

Clause 12. The RF sensing request device of clause 1, wherein the at least one criterion comprises an indication of an expected result of the RF sensing.

Clause 13. The RF sensing request device of clause 1, wherein the one or more processors are configured to:
receive input regarding a subject of the RF sensing from at least one information source other than the network entity; and
send a response to the RF sensing report to the network entity, the response including the input regarding the subject of the RF sensing.

Clause 14. The RF sensing request device of clause 1, wherein the RF sensing request is a first RF sensing request, and wherein the one or more processors are configured to send, via the interface to the network entity, a second RF sensing request based on the first RF sensing request.

Clause 15. A radio frequency (RF) sensing method comprising:
producing, at an application device, an RF sensing request including a request for a network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing;
sending the RF sensing request from the application device to the network entity; and
receiving, at the application device from the network entity, an RF sensing report indicating a result of the RF sensing.

Clause 16. The method of clause 15, wherein the at least one criterion comprises an indication of a type of the RF sensing.

Clause 17. The method of clause 16, wherein the type of the RF sensing comprises one of object presence detection, environment detection, or biological function detection.

Clause 18. The method of clause 15, wherein the RF sensing request includes the request for the network entity to coordinate the RF sensing of the region, and wherein the at least one criterion comprises a plurality of coordinates defining the region.

Clause 19. The method of clause 15, wherein the RF sensing request includes the request for the network entity to coordinate the RF sensing of the region, the request being for object presence detection in the region.

Clause 20. The method of clause 19, wherein the at least one criterion comprises a threshold Doppler phase shift for the object presence to be reported.

Clause 21. The method of clause 15, wherein the RF sensing request includes a request for the network entity to coordinate the RF sensing of at least one biological function.

Clause 22. The method of clause 21, wherein the at least one biological function includes at least one of heartbeat or respiration, and wherein the at least one criterion comprises a first identity of an RF transmitter and a second identity of an RF receiver to be used for the RF sensing.

Clause 23. The method of clause 21, wherein the at least one criterion comprises a Doppler rate.

Clause 24. The method of clause 23, wherein the at least one criterion comprises a range of Doppler rates.

Clause 25. The method of clause 15, wherein the at least one criterion comprises at least one of a duration of the RF sensing, a first frequency of the RF sensing, or a second frequency at which the network entity is to provide the RF sensing report indicating the result of the RF sensing.

Clause 26. The method of clause 15, wherein the at least one criterion comprises an indication of an expected result of the RF sensing.

Clause 27. The method of clause 15, further comprising:
receiving, at the application device, input regarding a subject of the RF sensing from at least one information source other than the network entity; and
sending a response to the RF sensing report from the application device to the network entity, the response including the input regarding the subject of the RF sensing.

Clause 28. The method of clause 15, wherein the RF sensing request is a first RF sensing request, and the method further comprises sending, from the application device to the network entity, a second RF sensing request based on the first RF sensing request.

Clause 29. A radio frequency (RF) sensing request device comprising:
means for producing an RF sensing request including a request for a network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing;
means for sending the RF sensing request to the network entity; and
means for receiving, from the network entity, an RF sensing report indicating a result of the RF sensing.

Clause 30. The RF sensing request device of clause 29, wherein the at least one criterion comprises an indication of a type of the RF sensing.

Clause 31. The RF sensing request device of clause 30, wherein the type of the RF sensing comprises one of object presence detection, environment detection, or biological function detection.

Clause 32. The RF sensing request device of clause 29, wherein the RF sensing request includes the request for the network entity to coordinate the RF sensing of the region, and wherein the at least one criterion comprises a plurality of coordinates defining the region.

Clause 33. The RF sensing request device of clause 29, wherein the RF sensing request includes the request for the network entity to coordinate the RF sensing of the region, the request being for object presence detection in the region.

Clause 34. The RF sensing request device of clause 33, wherein the at least one criterion comprises a threshold Doppler phase shift for the object presence to be reported.

Clause 35. The RF sensing request device of clause 29, wherein the RF sensing request includes a request for the network entity to coordinate the RF sensing of at least one biological function.

Clause 36. The RF sensing request device of clause 35, wherein the at least one biological function includes at least one of heartbeat or respiration, and wherein the at least one criterion comprises a first identity of an RF transmitter and a second identity of an RF receiver to be used for the RF sensing.

Clause 37. The RF sensing request device of clause 35, wherein the at least one criterion comprises a Doppler rate.

Clause 38. The RF sensing request device of clause 37, wherein the at least one criterion comprises a range of Doppler rates.

Clause 39. The RF sensing request device of clause 29, wherein the at least one criterion comprises at least one of a duration of the RF sensing, a first frequency of the RF sensing, or a second frequency at which the network entity is to provide the RF sensing report indicating the result of the RF sensing.

Clause 40. The RF sensing request device of clause 29, wherein the at least one criterion comprises an indication of an expected result of the RF sensing.

Clause 41. The RF sensing request device of clause 29, further comprising:

means for receiving input regarding a subject of the RF sensing from at least one information source other than the network entity; and means for sending a response to the RF sensing report to the network entity, the response including the input regarding the subject of the RF sensing.

Clause 42. The RF sensing request device of clause 29, wherein the RF sensing request is a first RF sensing request, and the RF sensing request device further comprises means for sending, to the network entity, a second RF sensing request based on the first RF sensing request.

Clause 43. A non-transitory, processor-readable storage medium comprising processor-readable instructions to cause one or more processors of a radio frequency (RF) sensing request device, in order to facilitate positioning of a user equipment, to:

produce an RF sensing request including a request for a network entity to coordinate RF sensing of at least one of a region or an object, wherein the RF sensing request includes at least one criterion of the RF sensing, the at least one criterion comprising at least one of an indication of the region, an identity of at least one RF sensing device, or an identity of a target object of the RF sensing;

send the RF sensing request to the network entity; and receive, from the network entity, an RF sensing report indicating a result of the RF sensing.

Clause 44. The non-transitory, processor-readable storage medium of clause 43, wherein the at least one criterion comprises an indication of a type of the RF sensing.

Clause 45. The non-transitory, processor-readable storage medium of clause 44, wherein the type of the RF sensing comprises one of object presence detection, environment detection, or biological function detection.

Clause 46. The non-transitory, processor-readable storage medium of clause 43, wherein the RF sensing request includes the request for the network entity to coordinate the RF sensing of the region, and wherein the at least one criterion comprises a plurality of coordinates defining the region.

Clause 47. The non-transitory, processor-readable storage medium of clause 43, wherein the RF sensing request includes the request for the network entity to coordinate the RF sensing of the region, the request being for object presence detection in the region.

Clause 48. The non-transitory, processor-readable storage medium of clause 47, wherein the at least one criterion comprises a threshold Doppler phase shift for the object presence to be reported.

Clause 49. The non-transitory, processor-readable storage medium of clause 43, wherein the RF sensing request includes a request for the network entity to coordinate the RF sensing of at least one biological function.

Clause 50. The non-transitory, processor-readable storage medium of clause 49, wherein the at least one biological function includes at least one of heartbeat or respiration, and wherein the at least one criterion comprises a first identity of an RF transmitter and a second identity of an RF receiver to be used for the RF sensing.

Clause 51. The non-transitory, processor-readable storage medium of clause 49, wherein the at least one criterion comprises a Doppler rate.

Clause 52. The non-transitory, processor-readable storage medium of clause 51, wherein the at least one criterion comprises a range of Doppler rates.

Clause 53. The non-transitory, processor-readable storage medium of clause 43, wherein the at least one criterion comprises at least one of a duration of the RF sensing, a first frequency of the RF sensing, or a second frequency at which the network entity is to provide the RF sensing report indicating the result of the RF sensing.

Clause 54. The non-transitory, processor-readable storage medium of clause 43, wherein the at least one criterion comprises an indication of an expected result of the RF sensing.

Clause 55. The non-transitory, processor-readable storage medium of clause 43, further comprising processor-readable instructions to cause the one or more processors to:

receive input regarding a subject of the RF sensing from at least one information source other than the network entity; and send a response to the RF sensing report to the network entity, the response including the input regarding the subject of the RF sensing.

Clause 56. The non-transitory, processor-readable storage medium of clause 43, wherein the RF sensing request is a first RF sensing request, and the non-transitory, processor-readable storage medium further comprises processor-readable instructions to cause the one or more processors to send, to the network entity, a second RF sensing request based on the first RF sensing request.

Clause 57. A network entity comprising:

an interface;

a memory; and one or more processors communicatively coupled to the interface and the memory and configured to:

receive, via the interface from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing;

45 determine a first radio frequency configuration and a second radio frequency configuration based on the radio frequency sensing request; and transmit, via the interface, the first radio frequency configuration to a radio frequency transmitter and the second radio frequency configuration to a radio frequency receiver.

Clause 58. The network entity of clause 57, wherein the one or more processors are further configured to determine the first radio frequency configuration and the second radio frequency configuration based on desired radio frequency sensing to be achieved by the radio frequency transmitter and the radio frequency receiver.

Clause 59. The network entity of clause 58, wherein the desired radio frequency sensing comprises detection of an environment of the region, presence detection in the region, biological function detection of the object, or any combination thereof.

Clause 60. The network entity of clause 57, wherein the one or more processors are further configured to:

receive, via the interface from the radio frequency receiver, a radio frequency result message indicating one or more results of radio frequency sensing by the radio frequency receiver;

determine a radio frequency sensing report based on the radio frequency result message; and transmit, via the interface to the application device, the radio frequency sensing report.

Clause 61. The network entity of clause 60, wherein the radio frequency sensing report indicates presence of the target object in a region of interest, a metric of a biological function, motion of the target object, a number of objects detected, a position of the target object, or any combination thereof.

Clause 62. A radio frequency sensing coordination method comprising:

receiving, at a network entity from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing;

determining, at the network entity, a first radio frequency configuration and a second radio frequency configuration based on the radio frequency sensing request; and transmitting, from the network entity, the first radio frequency configuration to a radio frequency transmitter and the second radio frequency configuration to a radio frequency receiver.

Clause 63. The radio frequency sensing coordination method of clause 62, wherein determining the first radio frequency configuration and the second radio frequency configuration is based further on desired radio frequency sensing to be achieved by the radio frequency transmitter and the radio frequency receiver.

Clause 64. The radio frequency sensing coordination method of clause 63, wherein the desired radio frequency sensing comprises detection of an environment of the region, presence detection in the region, biological function detection of the object, or any combination thereof.

Clause 65. The radio frequency sensing coordination method of clause 62, further comprising:

receiving, at the network entity from the radio frequency receiver, a radio frequency result message indicating one or more results of radio frequency sensing by the radio frequency receiver;

determining, at the network entity, a radio frequency sensing report based on the radio frequency result message; and transmitting, from the network entity to the application device, the radio frequency sensing report.

Clause 66. The radio frequency sensing coordination method of clause 65, wherein the radio frequency sensing report indicates presence of the target object in a region of interest, a metric of a biological function, motion of the target object, a number of objects detected, a position of the target object, or any combination thereof.

Clause 67. A network entity comprising:

means for receiving, from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing;

means for determining a first radio frequency configuration and a second radio frequency configuration based on the radio frequency sensing request; and means for transmitting the first radio frequency configuration to a radio frequency transmitter and the second radio frequency configuration to a radio frequency receiver.

Clause 68. The network entity of clause 67, wherein the means for determining the first radio frequency configuration and the second radio frequency configuration comprise means for determining the first radio frequency configuration and the second radio frequency configuration based further on desired radio frequency sensing to be achieved by the radio frequency transmitter and the radio frequency receiver.

Clause 69. The network entity of clause 68, wherein the desired radio frequency sensing comprises detection of an environment of the region, presence detection in the region, biological function detection of the object, or any combination thereof.

Clause 70. The network entity of clause 67, further comprising:

means for receiving, from the radio frequency receiver, a radio frequency result message indicating one or more results of radio frequency sensing by the radio frequency receiver;

means for determining a radio frequency sensing report based on the radio frequency result message; and means for transmitting, to the application device, the radio frequency sensing report.

Clause 71. The network entity of clause 70, wherein the radio frequency sensing report indicates presence of the target object in a region of interest, a metric of a biological function, motion of the target object, a number of objects detected, a position of the target object, or any combination thereof.

Clause 72. A non-transitory, processor-readable storage medium comprising processor-readable instructions to cause one or more processors of a network entity to:

receive, from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing;

determine a first radio frequency configuration and a second radio frequency configuration based on the radio frequency sensing request; and transmit the first radio frequency configuration to a radio frequency transmitter and the second radio frequency configuration to a radio frequency receiver.

Clause 73. The non-transitory, processor-readable storage medium of clause 72, wherein the processor-readable instructions to cause the one or more processors to determine the first radio frequency configuration and the second radio frequency configuration comprise processor-readable instructions to cause the one or more processors to determine the first radio frequency configuration and the second radio frequency configuration based further on desired radio frequency sensing to be achieved by the radio frequency transmitter and the radio frequency receiver.

Clause 74. The non-transitory, processor-readable storage medium of clause 73, wherein the desired radio frequency sensing comprises detection of an environment of the region, presence detection in the region, biological function detection of the object, or any combination thereof.

Clause 75. The non-transitory, processor-readable storage medium of clause 72, further comprising processor-readable instructions to cause the one or more processors to:

receive, from the radio frequency receiver, a radio frequency result message indicating one or more results of radio frequency sensing by the radio frequency receiver;

determine a radio frequency sensing report based on the radio frequency result message; and transmit, to the application device, the radio frequency sensing report.

Clause 76. The non-transitory, processor-readable storage medium of clause 75, wherein the radio frequency sensing report indicates presence of the target object in a region of interest, a metric of a biological function, motion of the target object, a number of objects detected, a position of the target object, or any combination thereof.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A radio frequency (RF) sensing request device comprising:
   an interface;
   a memory; and
   one or more processors communicatively coupled to the interface and the memory and configured to:
      send an RF sensing request to a network entity via the interface, the RF sensing request including a request for the network entity to coordinate RF sensing of a region for object presence detection in the region, wherein the RF sensing request includes at least two criteria of the RF sensing, the at least two criteria one criterion comprising a threshold Doppler phase shift for the object presence to be reported and comprising at least one of an indication of the region, an identity of at least one RF sensing device, or an identity of a target object of the RF sensing; and
      receive, via the interface from the network entity, an RF sensing report indicating a result of the RF sensing.

2. The RF sensing request device of claim 1, wherein the at least two criteria further comprise a plurality of coordinates defining the region.

3. The RF sensing request device of claim 1, wherein the at least two criteria further comprise at least one of a duration of the RF sensing, a first frequency of the RF sensing, or a second frequency at which the network entity is to provide the RF sensing report indicating the result of the RF sensing.

4. The RF sensing request device of claim 1, wherein the at least two criteria further comprise an indication of an expected result of the RF sensing.

5. The RF sensing request device of claim 1, wherein the one or more processors are configured to:
   receive input regarding a subject of the RF sensing from at least one information source other than the network entity; and
   send a response to the RF sensing report to the network entity, the response including the input regarding the subject of the RF sensing.

6. The RF sensing request device of claim 1, wherein the RF sensing request is a first RF sensing request, and wherein the one or more processors are configured to send, via the interface to the network entity, a second RF sensing request based on the first RF sensing request.

7. A radio frequency (RF) sensing method comprising:
   producing, at an application device, an RF sensing request including a request for a network entity to coordinate RF sensing of a region for object presence detection in the region, wherein the RF sensing request includes at least two criteria of the RF sensing, the at least two criteria comprising a threshold Doppler phase shift for the object presence to be reported and comprising at least one of an indication of the region, an identity of at least one RF sensing device, or an identity of a target object of the RF sensing;
   sending the RF sensing request from the application device to the network entity; and
   receiving, at the application device from the network entity, an RF sensing report indicating a result of the RF sensing.

8. The method of claim 7, wherein the at least two criteria further comprise a plurality of coordinates defining the region.

9. The method of claim 7, wherein the at least two criteria further comprise at least one of a duration of the RF sensing, a first frequency of the RF sensing, or a second frequency at which the network entity is to provide the RF sensing report indicating the result of the RF sensing.

10. The method of claim 7, wherein the at least two criteria further comprise an indication of an expected result of the RF sensing.

11. The method of claim 7, further comprising:

receiving, at the application device, input regarding a subject of the RF sensing from at least one information source other than the network entity; and sending a response to the RF sensing report from the application device to the network entity, the response including the input regarding the subject of the RF sensing.

12. The method of claim 7, wherein the RF sensing request is a first RF sensing request, and the method further comprises sending, from the application device to the network entity, a second RF sensing request based on the first RF sensing request.

13. A network entity comprising:

an interface;

a memory; and one or more processors communicatively coupled to the interface and the memory and configured to:

receive, via the interface from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing;

determine a first radio frequency configuration and a second radio frequency configuration based on the radio frequency sensing request; and transmit, via the interface, the first radio frequency configuration to a radio frequency transmitter and the second radio frequency configuration to a radio frequency receiver.

14. The network entity of claim 13, wherein the one or more processors are further configured to determine the first radio frequency configuration and the second radio frequency configuration based on desired radio frequency sensing to be achieved by the radio frequency transmitter and the radio frequency receiver.

15. A radio frequency sensing coordination method comprising:

receiving, at a network entity from an application device, a radio frequency sensing request including a request for the network entity to coordinate radio frequency sensing of at least one of a region or an object, wherein the radio frequency sensing request includes at least one criterion of the radio frequency sensing, the at least one criterion comprising at least one of an indication of the region, an identity of at least one radio frequency sensing device, or an identity of a target object of the radio frequency sensing;

determining, at the network entity, a first radio frequency configuration and a second radio frequency configuration based on the radio frequency sensing request; and transmitting, from the network entity, the first radio frequency configuration to a radio frequency transmitter and the second radio frequency configuration to a radio frequency receiver.

16. The radio frequency sensing coordination method of claim 15, wherein determining the first radio frequency configuration and the second radio frequency configuration is based further on desired radio frequency sensing to be achieved by the radio frequency transmitter and the radio frequency receiver.

\* \* \* \* \*